United States Patent
Gaudl et al.

(10) Patent No.: US 6,924,324 B2
(45) Date of Patent: Aug. 2, 2005

(54) PHOTOCURABLE COMPOSITION, PROCESS FOR PRODUCING PHOTOCURABLE RESIN, AND CROSSLINKED PRODUCT

(75) Inventors: Kai-Uwe Gaudl, Hohen Neuendorf (DE); Artur Lachowicz, Berlin (DE); Ken-ichi Yatsugi, Tokyo (JP); Gerwald F. Grahe, Berlin (DE)

(73) Assignee: Dainippon Ink and Chemicals, Inc., Tokyo (JP)

( * ) Notice: Subject to any disclaimer, the term of this patent is extended or adjusted under 35 U.S.C. 154(b) by 23 days.

(21) Appl. No.: 10/382,999

(22) Filed: Mar. 7, 2003

(65) Prior Publication Data

US 2003/0225180 A1 Dec. 4, 2003

(30) Foreign Application Priority Data

Mar. 7, 2002 (EP) .......................................... 02005212

(51) Int. Cl.⁷ .................................................. C08F 2/46
(52) U.S. Cl. ....................... 522/182; 522/168; 522/170; 522/113; 522/114; 522/120; 522/121; 522/74; 522/81; 428/355 R
(58) Field of Search ................................ 522/168, 170, 522/113, 114, 120, 121, 74, 81, 182, 181, 6, 33, 34, 36, 68, 71, 104, 107, 162, 178; 428/355 R

(56) References Cited

U.S. PATENT DOCUMENTS 6,025,410 A 2/2000 Moy et al.

FOREIGN PATENT DOCUMENTS

GB    2335424    * 9/1999

OTHER PUBLICATIONS

George Odian's, Principles of Polymerization (1970), p. 97.*

* cited by examiner

Primary Examiner—James J. Seidleck
Assistant Examiner—Sanza L McClendon
(74) Attorney, Agent, or Firm—Armstrong, Kratz, Quintos, Hanson & Brooks, LLP

(57) ABSTRACT

A photocurable composition is provided which yields an excellent tack-free, hard cured product without any addition of photoinitiators. A photocurable composition which is excellent in storage stability is also provided. The photocurable composition contains a resin having an acryloyl group and a chemical structure element selected from the group consisting of β-diketone groups and β-ketoester groups, wherein the β-diketone group or the β-ketoester group has a tetra-substituted carbon atom between two carbonyl groups, which is capable of generating one or two free radicals under photoirradiation, and the photocurable composition does not increase more than 25% in viscosity when heated at 60° C. for 5 days.

11 Claims, No Drawings

PHOTOCURABLE COMPOSITION, PROCESS FOR PRODUCING PHOTOCURABLE RESIN, AND CROSSLINKED PRODUCT

BACKGROUND OF THE INVENTION

1. Field of the Invention

The present invention relates to a photocurable composition, a process for producing photocurable resin, and a crosslinking product thereof. More specifically, the composition of the present invention is usable for coatings, printing inks or molded articles which are curable with UV light to day light without any addition of photoinitiators.

2. Description of Related Art

Monomers, oligomers and polymers containing acrylic acid ester groups, which are also termed acrylates, may be hardened by exposure to UV (ultraviolet) light. For this curing system, a photoinitiator is, as a rule, necessary, and forms free-radicals under photoirradiation and initiates free-radical polymerization of the acrylate groups, which then leads to a hardening of the product. Monomers, oligomers and polymers containing acrylate groups as well as photo-initiators are essential constituents of radiation-hardening systems that are used as coatings, printing inks, adhesives, or molding compositions.

However, the above-mentioned radiation-hardening systems containing photoinitiators are not entirely problem-free. For example, unreacted photoinitiators as well as their cleavage products remain in the coating and may cause various problems. For example, residues of photoinitiators and cleavage products can migrate through polymeric coatings and affect adjacent products. In the foodstuff packaging industry, this may lead to contamination of the foodstuffs themselves, which has to be avoided (U.S. Food and Drug Administration, "Recommendations for Chemistry Data for Indirect Food Additive Petitions").

Furthermore, residues of photoinitiators such as, for example, benzophenone, or volatile cleavage products such as, for example, benzaldehyde, that are formed by free-radical cleavage of α-cleavable compounds may in addition lead to the formation of an odor that adversely affects the quality of the hardened products.

Furthermore, serious problems that can be caused by photoinitiators include yellowing, which may occur when using amine-containing co-initiators, as well as an insufficient through-hardening in the case of thick layers as a result of strong light absorption by the photoinitiators.

On account of the aforementioned disadvantages, the need has arisen in the technology to provide acrylate group-containing systems that can harden in the absence of added and known photoinitiators.

As a means for overcoming these problems, there have been proposed a photoinitiator-free oligomeric composition having acryloyl groups. For example, U.S. Pat. No. 6,025,410 discloses liquid oligomeric compositions produced by Michael addition reaction of acetoacetates with acrylates, in which the composition can be polymerized under UV light in the absence of photoinitiators.

The liquid oligomeric compositions, however, have a problem in that the cured products thereof result in soft and tacky films (as described in column 12, lines 39–40). Although these properties are desirable for many applications, for example for adhesives, they are undesirable for other applications, for example as coating lacquers as well as for molded articles. Moreover, the storage stability of a few months of the liquid oligomeric compositions is still unsatisfactory.

BRIEF SUMMARY OF THE INVENTION

It is therefore an object of the invention to provide a photocurable composition which yields an excellent tack-free, hard cured product without any addition of photoinitiators.

Another object is to provide a photocurable composition which is excellent in storage stability.

We have now found that a composition containing an acryloyl group containing resin having a β-ketoester group or a β-diketone group which has a tetra-substituted carbon atom between two carbonyl groups, which is capable of generating one or two free radicals under photoirradiation, and having a property that the photocurable composition does not increase more than 25% in viscosity when heated at 60° C. for 5 days, can give a tack-free product which has excellent hardness by photoirradiation, and is excellent in its storage stability.

Accordingly, the present invention provides a photocurable composition containing a resin having an acryloyl group and a chemical structure element selected from the group consisting of β-diketone groups and β-ketoester groups, wherein the β-diketone group or the β-ketoester group has a tetra-substituted carbon atom between two carbonyl groups, which is capable of generating one or two free radicals under photoirradiation, and the photocurable composition does not increase more than 25% in viscosity when heated at 60° C. for 5 days.

The present invention also provides a process for producing a photocurable resin which does not increase more than 25% in viscosity when heated at 60° C. for 5 days comprising:

reacting a β-ketoester or a β-diketone with a polyfunctional acrylic acid ester in the presence of a catalyst under the conditions that a) the reaction temperature is 60 to 140° C., b) the ratio of acrylic acid groups to β-dicarbonyl groups is 2.5:1 to 20:1.

Furthermore, the present invention provides a crosslinked product obtained by photoirradiation of the above-mentioned composition.

DETAILED DESCRIPTION OF THE INVENTION

The resin to be incorporated in the photocurable composition according to the invention has an acryloyl group and a chemical structure element selected from the group consisting of a β-diketone group and a β-ketoester group, wherein the β-diketone group or the β-ketoester group have a tetra-substituted carbon atom between two carbonyl groups, which is capable of generating one or two free radicals under photoirradiation.

The tetra-substituted carbon atom between two carbonyl groups has two substituents other than the two carbonyl groups, and the β-diketone or β-ketoester group having the two substituents at the tetra-substituted carbon atom can be obtained by disubstitution of a β-diketone group or a β-ketoester group at their methylene group with the substituents of the following 1) to 3).

Examples of substituents of the β-diketone groups or β-ketoester groups include:

1) an electron attracting group,
2) an alkyl group having a carbon number of 1 to 8,
3) an alkyl group having a carbon number of 1 to 8, which has an electron attracting group at the β or γ position to both carbonyl groups of the β-diketone groups or β-ketoester groups. Here, the term "β position" means the position of the carbon atom next to the "α-position", which means the position of the tetra-substituted carbon atom. Furthermore, the term "γ position" means the position of the carbon atom next to the β position.

However, when each of the two substituents is the alkyl group 2), the alkyl group 2) is selected from methyl group and ethyl group.

In the present invention, excellent self-photocurability was given by the chemical structure elements selected from the group consisting of the β-diketone or β-ketoester group and by their two substituents, because the chemical structure elements can generate one or two free radicals easily by photoirradiation.

Examples of the electron attracting group include a ketone group, an ester group, an ether group, carboxyl, a cyano group, a sulfonic acid group, a sulfonyl group, a phosphate group.

Furthermore, examples of the β-diketone group elements include the following chemical structure elements:

A-1
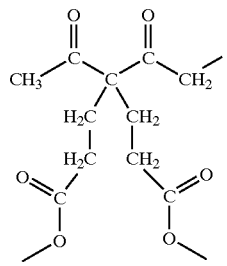

A-2
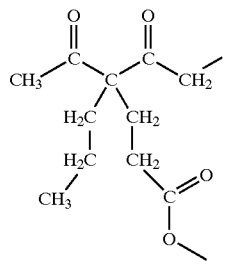

A-3
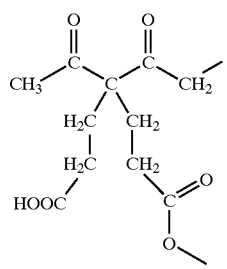

A-4
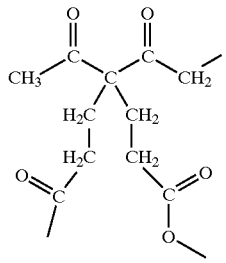

A-5
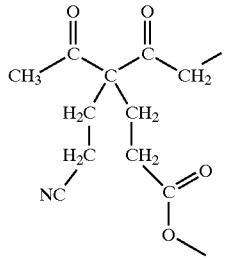

A-6
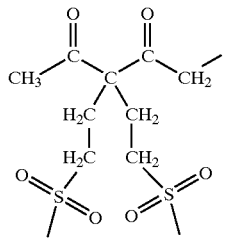

A-7
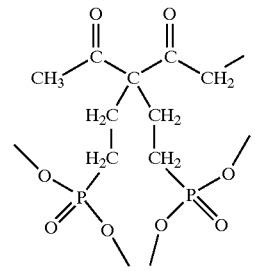

A-8
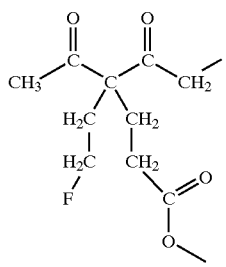

A-9
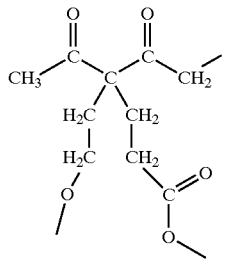

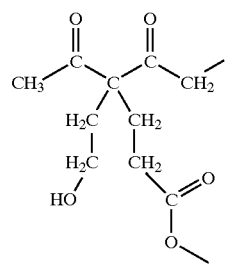
A-10
The examples of the β-ketoester group elements include the following chemical structure elements:
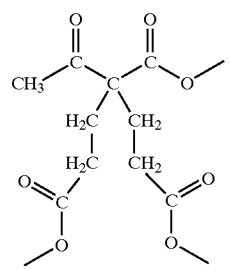
B-1
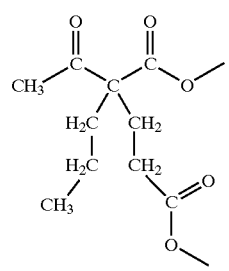
B-2
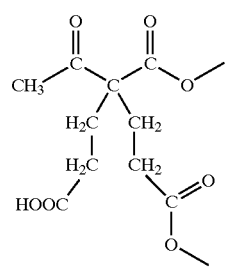
B-3
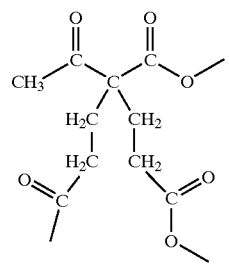
B-4
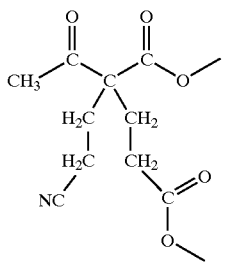
B-5
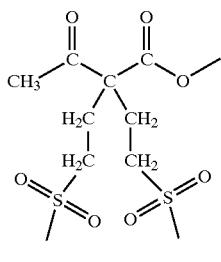
B-6
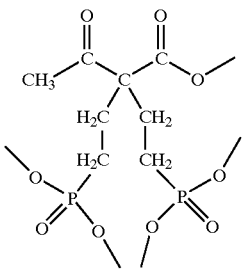
B-7
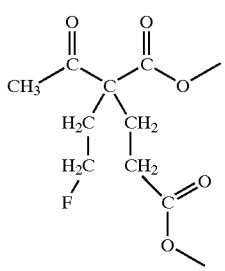
B-8
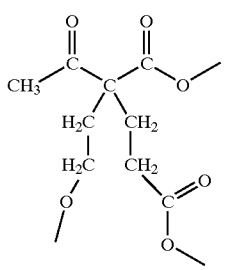
B-9
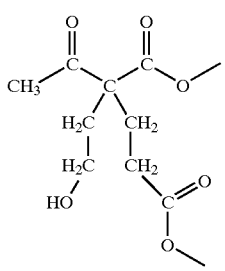
B-10

-continued

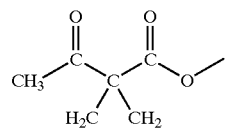
B-11

Preferred among the above-exemplified chemical structure elements are the β-diketone group elements, because the resins having the chemical structure elements are sensitive not only to UV light, but also to day light which contains wavelengths predominantly above 400 nm. Therefore, the resins can be easily cured by day light without addition of photoinitiators. Due to this remarkable property, the resins having the β-diketone group elements can be used in the form of a thickly applied layer as coatings. That is, UV irradiation is not suitable for curing of a thickly applied layer because the resin itself prevents the radiation from being absorbed sufficiently for thorough curing of the resin; on the other hand day light is effective for penetrating a thickly applied layer so that the resins are preferably applied for coatings which are usable for a thick layer. The preferable thickness range of the thick layer made of the coatings comprising the resin are, for example, within the range of 500 to 5000 μm. However, in the day light curing system, an oxygen atmosphere is not suitable for their curing. Therefore, in order to accelerate the curing speed, day light irradiation should be carried out in the absence of oxygen.

From the viewpoints of ease of incorporation of the acryloyl group and excellent photo-initiation ability, the chemical structure elements having ester group substituted ethyl group such as A-1, A-2, A-3, A-4, A-5, A-8, A-9, A-10, B-1, B-2, B-3, B-4, B-5, B-8, B-9, and B-10 are preferable among the above-described chemical structure elements. Moreover, a chemical structure element disubstituted only by an ester group substituted ethyl group such as A-1 and B-1 is particularly preferred because they exhibit good curability with photo-irradiation and give increased hardness of the cured product.

The resin to be incorporated in the photocurable composition according to the invention is characterized in having the aforementioned chemical structure elements partially in their specific chemical structures of the resin. That is, the entirety of the chemical structure may be determined in accordance with structures of their starting materials mentioned below.

The resin to be incorporated in the photocurable composition according to the invention is also characterized in that the resin does not cause an increase of more than 25% in viscosity of the photocurable composition when heated at 60° C. for 5 days. For that purpose, a resin which does not increase more than 25% in viscosity thereof when heated at 60° C. for 5 days is particularly preferable.

This is due to the complete Michael addition reaction. According to complete disubstitution of a β-diketone group or a β-ketoester group with said substituents, the hardness in the cured product thereof drastically improved.

This property can be obtained by control of reaction condition in producing the resin.

In general, in the case of undergoing Michael addition reaction to prepare the disubstitution of a β-ketoester or a β-diketone, higher temperatures and longer reaction time results in the resin having the above property.

These resins having the β-diketone or β-ketoester group elements such as A-1 to A-10, and B-1 to B-11 can be obtained by standard well-known organic syntheses, such as Michael addition and alkylation.

For example, a compound having an A-1 or B-1 structure element and compound having a B-1 structure element can be synthesized from β-ketoester or β-diketone and acrylates by base-catalyzed Michael addition (review on Michael Addition: Bergmann, Ginsburg, Pappo, *Org. React.* 10, p. 179–560 (1959), the contents of which are hereby incorporated by reference).

A compound having an A-2 or B-2 structure element can be obtained by reacting halogenated alkyl with a β-ketoester or β-diketone by aliphatic nucleophilic substitution (e.g.: Yoshimura, Saito, Tamura, Tanikaga, Kaj, *Bull Chem. Soc. Jpn.* 52, p.1716. (1979) or House "Modern Synthetic Reactions", $2^{nd}$, ed., pp. 492–570, 586–595 or Fedorynski, Wojciechowski, Matacz, Makosza, *J. Org. Chem.* 43, 4682. (1978), the contents of which are hereby incorporated by reference) and subsequent addition of an acrylate by the base-catalyzed Michael reaction, or vice versa.

A compound having an A-3 or B-3 structure element can be obtained, for example, by Michael addition of tert-butyl acrylate to a β-ketoester or β-diketone, conversion of the tert-butyl ester to the corresponding carboxylic acid by an acidic-catalyzed ester cleavage and finally reacting the obtained compound with an acrylic ester by a base-catalyzed Michael addition step.

A compound having an A-4 or B-4 structure element can be obtained by two subsequent Michael addition reactions of firstly a vinyl ketone and secondly an acrylate, or vice versa, to β-ketoester or β-diketone.

A compound having an A-5 or B-5 structure element can be obtained by Michael addition of first acrylonitrile and secondly an acrylate, or vice versa, to β-ketoester or β-diketone.

The synthesis of a compound having an A-6 or B-6 structure element can proceed through the Michael addition of vinyl sulfone to β-ketoester or β-diketone (Truce, W. E., Wellisch, E.; *J. Amer. Chem. Soc.* 74, 2881. (1952), the contents of which are hereby incorporated by reference).

Compounds A-7 as well as B-7 can be prepared by the Michael addition of vinyl phosphonate to β-ketoester or β-diketone.

A compound having an A-8 or B-8 structure element can be obtained through the Michael addition of an acrylate to β-ketoester or β-diketone and subsequently reacting with a β-dihalogenated alkyl.

A compound having an A-9 structure element can be prepared by reacting an aliphatic σ-oxo-alkyl alkyl ether with acetyl chloride in the presence of a strong base like sodium amide of tritylium salt (Hegodus, L. S.; Williams, R. E.; McGuire, M. A.; Hagashi, T. *J. Am. Chem. Soc.* 102; 4973 (1980) or House, H. O.; Auerbach, R. A.; Gall, M.; Peet, N. P.; J. Org. Chem. 38; 514 (1973) or Seebach, D.; Walter, T.; Protschuk, G.; Beck, A. K.; Hoestra, M. S.; *Helv. Chim. Acta* 64; 716 (1981), the contents of which are hereby incorporated by reference) or by reacting the silyl enol ether of a σ-oxo-ether with acetic acid anhydride in the presence of boron trifluoride (Hauser, C. R.; Swamer, F. W.; Adams, J. T.; *Org Chem. React.* 8, 59, p. 98 (1954), the contents of which are hereby incorporated by reference) and subsequently reacting the obtained β-dicarbonyl intermediate with an acrylate in the base-catalyzed Michael addition.

A compound having a B-9 structure element can be synthesized by the acylation of an 1-alkyloxy-butanoate in the presence of a strong base like lithium isopropylcyclohexyl amide at −78° C. (Rathke, M. W.; Deitch, J. *Tetrahedron Lett.* 2953 (1971) or Logue, M. W. *J. Org. Chem.* 39; 3455 (1974) or Conffigual, R.; Moreau, J. *J. Organomet. Chem.* 127; C65 (1977) or Ohta, S; Shimabayashi, A.;

Hayakawa, S.; Sumino, M.; Okamoto, M. *Synthesis* 45 (1985) or Hayden, W.; Pucher, R; Griengl, H. *Monatshefte Chem.* 118; 415 (1987), the contents of which are hereby incorporated by reference) and subsequent base-catalyzed Michael addition of an acrylate.

A compound having an A-10 structure element can be prepared by reacting the silyl enol ether of an aliphatic σ-oxo-alkyl trimethylsilylether with acetic acid anhydride, e.g., in the presence of boron trifluoride followed by the Michael addition of an acrylate and hydrolysis of the silyl ether.

The preparation of a compound having a B-10 structure element can proceed by reacting the 1-trimethylsilyloxy-butanoate with acetic acid anhydride in the presence of a strong base like lithium isopropylcyclohexyl amide at −78° C. followed by the Michael addition of an acrylate and hydrolysis of the silyl ether.

A compound having a B-11 structure element can be given by reacting β-ketoester with excess alkyl halide using a base or modified alumina surface as catalyst (Johnson, A. W., Markham, E., Price, P.; *Org. Synth.* CV5; p. 785 and Ranu, B., Bhar, Sanjay; *J. Chem. Soc. Perkin Trans.* 1; p. 365. (1992), the contents of which are hereby incorporated by reference).

Among the aforementioned processes, in order to obtain a preferable resin having the chemical structure A-1 or B-1, the process of the present invention is preferable from the viewpoint of storage stability of the compound and surface hardness after curing.

That is, the most preferable process is a process for producing a photocurable resin which does not increase more than 25% in viscosity when heated at 60° C. for 5 days comprising:

reacting a β-ketoester or a β-diketone with a polyfunctional acrylic acid ester in the presence of a catalyst under the conditions that
 a) the reaction temperature is 60 to 140° C.,
 b) the ratio of acrylic acid groups to β-dicarbonyl groups is 2.5:1 to 20:1.

Here, the poly-functional acrylic acid ester which is suitable for the present invention include for example: 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol A diglycidyl ether diacrylate, ethoxylated bisphenol A diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate, as well as acrylate group-containing oligomers and polymers obtained by reacting polyepoxides with acrylic acid (epoxyacrylates) or obtained by reacting polyester polyols with acrylic acid and/or monomeric alkyl acrylates (polyester acrylates).

Particularly preferable examples include monomeric difunctional or trifunctional acrylates selected from the group consisting of tripropylene glycol diacrylate, trimethylolpropane triacrylate and bisphenol A diglycidyl ether diacrylate. Furthermore, among these compounds, tripropylene glycol diacrylate and trimethylolpropane triacrylate are particularly preferable when they are used in a day light curing system.

The β-diketone and β-ketoester which are suitable for the production of the initiator-free hardenable products according to the invention include for example: pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester, benzoylacetic acid methyl ester, benzoylacetic acid ethyl ester, benzoylacetic acid butyl ester, propionylacetic acid ethyl ester, propionylacetic acid butyl ester, butyrylacetic acid methyl ester, acetoacetic acid methyl ester, acetoacetic acid ethyl ester, acetoacetic acid isopropyl ester, acetoacetic acid butyl ester, acetoacetic acid tert-butyl ester, acetoacetic acid-(2-methoxyethyl) ester, acetoacetic acid-(2-ethylhexyl) ester, acetoacetic acid lauryl ester, 2-acetoacetoxyethyl acrylate, 2-acetoacetoxyethyl methacrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, ethoxylated bisphenol A diacetoacetate, trimethylolpropane triacetoacetate, glycerol triacetoacetate, pentaerythritol triacetoacetate, pentaerythritol tetraacetoacetate, ditrimethylolpropane tetraacetoacetate, dipentaerythritol hexaacetoacetate as well as acetoacetate group-containing oligomers and polymers obtained by transesterification of acetoacetic acid ethyl esters with oligomeric or polymeric polyols, and acetoacetate group-containing oligomers and polymers obtained by copolymerization of 2-acetoacetoxyethyl methacrylate.

Particularly preferable examples are benzoylacetic acid ethyl ester, acetoacetic acid methyl ester, acetoacetic acid ethyl ester, phenyl-1,3-butanedione and pentane-2,4-dione, 1,3-diphenyl-1,3-propanedione and polymeric diacetoacetates which have been produced by transesterification of unsaturated polyester diols with ethyl acetoacetate.

Furthermore, as mentioned above, the obtained resins produced by using the β-diketones can exhibit excellent day light curability, therefore the β-diketone is preferable in view of day light curing system.

The catalyst suitable for the production of the products in the present invention include:

1) a salt from the group comprising an ammonium fluoride such as for example, benzyltrimethylammonium fluoride, benzyltriethylammonium fluoride, benzyltributylammonium fluoride, tetramethylammonium fluoride, tetraethylammonium fluoride and tetrabutylammonium fluoride, 2) a compound from the group comprising an organic ammonium hydroxide and an ammonium methoxide, such as for example benzyltrimethylammonium hydroxide (Triton B), benzyltriethylammonium hydroxide, benzyltributylammonium hydroxide, tetramethylammonium hydroxide, tetraethylammonium hydroxide, tetrabutylammonium hydroxide, benzyltrimethylammonium methoxide and benzyltrimethylammonium methoxide, 3) an organic amine with a pK>11, such as for example piperidine, 1,4-dihydroxypyrimidine, 2-phenylbenzimidazole, 2-hydroxypyridine, diazabicyclooctane, diazabicyclononene, diazabicycloundecene and tetramethylguanidine, 4) an inorganic base such as for example sodium carbonate, potassium carbonate, calcium carbonate, calcium hydroxide, sodium hydroxide, potassium hydroxide, sodium hydride, lithium diisopropylamide and sodium amide, 5) an alkyl metal alcoholate or phenolate such as for example sodium methylate, potassium methylate, sodium ethylate, potassium ethylate, magnesium ethanolate, sodium tert-butylate, potassium tert-butylate, sodium phenolate and potassium phenolate, 6) a tertiary organic phosphine such as for example tripropylphosphine, triisopropylphosphine, trivinylphosphine, tributylphosphine, triisobutylphosphine, tri-tert-butylphosphine, triallylphosphine, tris(2,4,4-trimethylpentyl)phosphine, tricyclopentylphosphine, tricyclohexylphosphine, cyclohexyldiphenylphosphine, dicyclohexylphenylphosphine, triphenylphosphine, tri-n-octylphosphine, tri-n-dodecylphosphine, tribenzylphosphine, dimethylphenylphosphine, 1,2-bis(diphenylphosphino)ethane, 1,3-bis(diphenylphosphino)propane, 1,4-bis(diphenylphosphino)butane. Particularly suitable catalysts for the production of the products according to the invention are tetrabutylammonium fluoride, benzyltrimethylammonium fluoride, benzyltrimethylammonium hydroxide, tetrabutylammonium hydroxide, potassium hydroxide, tetramethylguanidine, diazabicycloundecene, sodium tert-butylate and tri-n-octyphosphine. The aforementioned catalysts may also be used in the form of a mixture of several catalysts.

Preferred among the above mentioned catalysts is 6) tertiary organic phosphine, because according to use of the tertiary organic phosphines as a catalysts highly anti-hydrolytic properties of the cured products can be obtained, furthermore, yellowing of the cured products can be avoided.

The process of the present invention is carried out by reacting the poly-functional acrylic acid ester with the β-ketoester or β-diketone at elevated temperatures in the presence of the aforedescribed catalysts, which catalyze particularly strongly the reaction between the reactants. Here, the β-ketoester or β-diketone may be used as a mixture thereof.

The preferable amount of catalyst added is within the range of 0.3 to 5.0% by weight based on the total reaction mixture. The particularly preferable amount of catalyst is within the range of 0.7 to 2.5% by weight. The reaction temperature is selected from the range 60° C. to 140° C., preferably 80° C. to 110° C.

During the reaction of the poly-functional acrylic acid esters with the β-ketoester or β-diketone, the reaction mixture is aerated. In addition, in the case of using sensitive acrylates, a polymerization inhibitor may also be added in an amount of 0.01 to 0.5% by weight in order to prevent an undesired polymerization of the acrylate groups during the production. Suitable polymerization inhibitors include, for example, 4-methoxyphenol and hydroquinone.

The reaction time is governed by the special catalyst effect and reaction temperature and is defined by the point in time after which the viscosity of the forming, acrylate group-containing oligomers and polymers no longer rises. Therefore, the reaction temperature shall be maintained until the viscosity of the resultant resin does not increase substantially. Here, the resultant resin does not increase more than 25% in viscosity when heated at 60° C. for 5 days.

In addition, the reaction may be carried out in one step, or may be carried out in two steps. The two-step reaction comprises reacting the β-ketoester or β-diketone with the poly-functional acrylic acid ester to produce mono-substituted compound, then carrying out a second reaction by addition of the rest of poly-functional acrylic acid ester or by increasing temperatures to produce a disubstituted compound.

The molar ratio of acrylate groups to the sum total of the β-ketoester group or β-diketone group, which means a molar ratio of (acrylate groups):(β-ketoester groups or β-diketone groups), is within the range of 2.5:1 to 20:1, wherein the range means the ratio based on total amount of poly-functional acrylic acid ester in the case of the two-step reaction and the ratio is governed by the functionality of the reactants. As a general rule of thumb, the higher the functionality of the β-ketoester or β-diketone that is used, the higher must be the excess of acrylate groups so that a soluble, applicable resin is formed. With ratios of acrylate groups to β-ketoester groups and β-diketone groups of less than 2.5:1 there is the danger of a gelling of the products, particularly if they have been formed from trifunctional and higher functional acrylates and β-diketoester compounds. With an excess of the acrylate groups greater than 20:1, the ability to form hard and tack-free products under UV light or day light is limited. In this case, there may be an insufficient hardening of the products under UV light.

The products obtained by the production method described above are liquid, with viscosities of 1000 to 100000 mPa·s at 25° C., and are colorless or slightly yellowish. The resultant molecular weights (Mn) of the products are 500 to 20000.

In a preferred embodiment for the production of the photo curable resin according to the invention, the catalyst is first of all mixed in the β-ketoester or β-diketone, and stirred. In this connection the reaction mixture often undergoes a slight heating or change in color since strong catalysts in particular interact directly with the β-ketoester and β-diketone and activate the latter by enolization or carbanion formation. This mixture is then added dropwise at reaction temperatures of 60° to 140° C. to the poly-functional acrylic acid esters. The amount added dropwise is regulated so that the temperature remains in the chosen temperature range and does not rise uncontrollably due to the exothermic reaction.

The mixture is then stirred for a certain time while keeping the temperature in the range. The end of the reaction is reached when the viscosity no longer continues to rise substantially. At that time, the viscosity of the resultant resin exhibits properties so as not to change more than 25% on heating for 5 days at 60° C. This procedure has various advantages. Due to the controlled process conditions, it is ensured that the reaction continues up to its end point, that is, the complete substitution of the acid function of the β-ketoester or β-diketone.

Purification may be carried out in various ways. For example, the product may be passed through an acidic ion exchanger that removes a basic catalyst, or the catalyst can be neutralized by addition of acids and then precipitated and filtered off. Combined anion exchangers and cation exchangers are suitable for removing salt-type catalysts.

In this way, low molecular weight compounds selected from the group comprising the β-ketoester and the β-diketone, which may under certain circumstances be toxicologically harmful, are completely reacted. Products that have been produced in this way furthermore exhibit practically no increase in viscosity when stored at elevated temperature, whereas products that have been produced by reacting the poly-functional acrylic acid esters with the β-ketoester or β-diketone at room temperature or under uncontrolled reaction conditions exhibit sharp rises in viscosity in prolonged storage or under storage at elevated temperature.

The photocurable composition of the invention may comprise the above-mentioned resin alone or may further comprise other photocurable monomers or resins in combination.

Examples of the photocurable monomers include dipropylene glycol diacrylate, trimethyrolpropane-triacrylate, and pentaerythritol tetraacrylate.

Examples of the other photocurable resins include acrylated epoxy resins, acrylated polyurethanes, and acrylated polyesters.

The photocurable composition of the invention may be used as coatings, printing inks and molded articles because a tack-free and hard cured product can be obtained.

Furthermore, the coatings may comprises a proper amount of a colorant such as a dye or a pigment selected from carbon black, titanium white, phthalocyanine, an azo dyestuff or quinacridone, or an inorganic filler such as Si fine particles, mica or calcium carbonate.

Although the photocurable composition exhibits good self curability as mentioned above, furthermore, a known initiator or a known photo-polymerization sensitizer may be added in order to accelerate their photocurability.

The photocurable composition according to the invention as coatings can be applied to suitable substrates such as for example paper, polyethylene, polypropylene, polyester, polyvinylidene chloride, aluminum, steel or wood and hardened in air under UV irradiation or under day light by a conventional coating method using a roll coater or a knife coater or a conventional printing method such as an offset printing method, a gravure printing method, or a silk screen printing method, to form a film or coating having a thickness of 0.1 to 5000 μm.

Commercially available mercury high-pressure radiators or microwavelength-excited radiators without electrodes may be used for the hardening. Particularly suitable are microwavelength-excited so-called H bulbs. These radiators also emit in a range from 225 to 325 nm in which the products according to the invention also absorb.

On the other hand, as mentioned above, the photocurable composition according to the invention can be cured by irradiation by day light when the β-diketone group is incorporated in the resin, so that cured thick layers having a thickness of 500 to 5000 μm can be obtained. In the case of using day light, in order to exclude oxygen, layers can be cured under an inert gas such as nitrogen, carbon dioxide, or the curable layers can be covered by thin transparent plastic wrap such as polyethylene film. In application as day light curable adhesive, which is quite suitable for adhesion of glass articles.

According to this invention, a photocurable composition can be provided, which gives excellent tack-free, hard cured product without any addition of photoinitiators, and also have excellent storage stability.

Therefore, the photocurable compositions are suitable for producing UV-hardenable coatings, printing inks, adhesives, sheets and molding compositions.

EXAMPLES

The present invention will now be described in detail with reference to the following examples.

General Production Method (Examples 1 to 10)

The acrylic acid esters are placed in a reaction vessel, aerated and heated to the reaction temperature. The component consisting of a mixture of β-ketoesters, β-diketones, and catalyst is then added at the reaction temperature. The reaction mixture is now stirred at the reaction temperature and from time to time a sample is taken and the viscosity is measured. The end of the reaction is reached when the viscosity of the mixture does not increase any further. Heating is then discontinued and the product is cooled to room temperature.

| Ex. | Mixture | | Catalyst | Catalyst Amount (wt. %) | Reaction Conditions | Viscosity (mPa · s) |
|---|---|---|---|---|---|---|
| 1 | TMPTA | 0.33 mole | $(Bu)_4NF$ | 0.9% | 80° C./2.5 h | 30000 |
|   | Acetylacetone | 0.12 mole | | | | |
|   | Ethyl acetoacetate | 0.01 mole | | | | |
| 2 | TMPTA | 0.33 mole | $(Bu)_4NF$ | 0.7% | 90° C./2.5 h | 8500 |
|   | Acetylacetone | 0.07 mole | | | | |
|   | Ethyl acetoacetate | 0.03 mole | | | | |
| 3 | TMPTA | 0.33 mole | $(Bu)_4NOH$ 40% in methanol | 2.0% | 80° C./2 h | 6400 |
|   | Acetylacetone | 0.09 mole | | | | |
|   | Ethyl acetoacetate | 0.01 mole | | | | |
| 4 | TMPTA | 0.33 mole | TOP | 0.7% | 90° C./2 h | 8000 |
|   | Acetylacetone | 0.05 mole | | | | |
|   | Ethyl acetoacetate | 0.05 mole | | | | |
| 5 | TMPTA | 0.33 mole | KOTBU | 0.5% | 80° C./2 h | 8000 |
|   | Acetylacetone | 0.05 mole | | | | |
|   | Benzoyl acetoacetate | 0.03 mole | | | | |
|   | Ethyl acetoacetate | 0.02 mole | | | | |
| 6 | TMPTA | 0.33 mole | KOTBU | 0.7% | 100° C./4 h | 16000 |
|   | Acetylacetone | 0.06 mole | | | | |
|   | Benzoyl acetoacetate | 0.04 mole | | | | |
|   | Benzoylacetone | 0.03 mole | | | | |
| 7 | TMPTA | 0.33 mole | DBU | 1.0% | 120° C./5 h | 25000 |
|   | Acetylacetone | 0.08 mole | | | | |
|   | Ethyl acetoacetate | 0.02 mole | | | | |
| 8 | TPGDA | 0.35 mole | TMG | 1.0% | 90° C./2 h | 18000 |
|   | Acetylacetone | 0.04 mole | | | | |
|   | Ethyl acetoacetate | 0.08 mole | | | | |

-continued

| Ex. | Mixture | | Catalyst | Catalyst Amount (wt. %) | Reaction Conditions | Viscosity (mPa · s) |
|---|---|---|---|---|---|---|
| 9 | ¹Polyester acrylate | 0.10 mole | DBU | 1.0% | 80° C./2 h | 40000 |
|   | TPGDA | 0.23 mole | | | | |
|   | Acetylacetone | 0.08 mole | | | | |
|   | Ethyl acetoacetate | 0.02 mole | | | | |
| 10 | ²Epoxyacrylate | 0.23 mole | (Et)$_4$NOH | 1.0% | 80° C./2 h | 50000 |
|   | TMPTA | 0.13 mole | | | | |
|   | Acetylacetone | 0.07 mole | | | | |
|   | Ethyl acetoacetate | 0.03 mole | | | | |

TMPTA = trimethylolpropane triacrylate,
(Bu)$_4$NF = tetrabutylammonium fluoride,
(Bu)$_4$NOH = tetrabutylammonium hydroxide,
TOP = tri-n-octylphosphine,
DBU = diazabicyloundecane,
TMG = tetramethylguanidine,
KOTBU = potassium tert-butylate,
¹produced from phthalic anhydride, trimethylolpropane, propylene glycol and acrylic acid;
²produced from bisphenol A diglycidyl ether and acrylic acid.

Comparative Example 1

Production at Low Temperature 59.2 g of trimethylolpropane triacrylate were mixed with 0.40 g of diazabicycloundecene and 13.0 g of acetoacetic acid ethyl ester were added dropwise within 15 minutes while stirring. The mixture was then stirred after the cessation of the slightly exothermic reaction for 1 hour at room temperature. A slightly yellowish liquid having a viscosity of 7040 mPa·s at 25° C. was obtained.

Comparative Example 2

Production at High Temperature without Catalyst and with Long Reaction Time 60.0 g of trimethylolpropane triacrylate, 7.0 g of acetoacetic acid ethyl ester and 6.0 g of acetylacetone were mixed and 0.05 g of 4-methoxyphenol was added as a polymerization inhibitor. The mixture was then aerated for 4 hours and heated to 130° C. After cooling, a slightly viscous yellowish liquid having a viscosity of 400 mPa·s at 25° C. was obtained.

(Comparison of Storage Stability)

The followings are comparisons of storage stability between the product from Example 1 according to the invention and the product from Comparative Example 1, which was produced under the reaction conditions specified in U.S. Pat. No. 6,025,410.

Whereas the viscosity of the product from Example 1 rose by 10%, the viscosity of the product from the comparative example rose by 205%.

| Product of Example | Viscosity after Production (mPa · s at 25° C.) | Viscosity after Storage for one week at 60° C. (mPa · s at 25° C.) | Change (%) |
|---|---|---|---|
| Example 1 | 30000 | 33000 | 10 |
| Comparative Example 1 | 7040 | 21500 | 205 |

(Properties of Cured Coatings)

The following table shows various products from Examples 1 to 10 that have been hardened under UV light. The hardness of the coatings obtained was investigated after the hardening with UV radiation using various lead pencils, and their solvent resistance was investigated with methyl ethyl ketone (MEK).

| Product of Example | Layer Thickness | Irradiated Energy[1] | Solvent Resistance[2] | Lead Pencil Hardness[3] |
|---|---|---|---|---|
| 1 | ~60 μm | 0.6 J/cm$^2$ | >75 | 4 H |
| 2 | ~40 μm | 0.6 J/cm$^2$ | >75 | 2 H |
| 3 | ~40 μm | 0.6 J/cm$^2$ | >75 | H |
| 4 | ~50 μm | 0.6 J/cm$^2$ | >75 | 3 H |
| 5 | ~40 μm | 0.6 J/cm$^2$ | >75 | 4 H |
| 6 | ~40 μm | 0.6 J/cm$^2$ | >75 | 4 H |
| 7 | ~25 μm | 0.6 J/cm$^2$ | >75 | 3 H |
| 8 | ~25 μm | 0.6 J/cm$^2$ | ~35 | H |
| 9 | ~30 μm | 0.6 J/cm$^2$ | ~75 | 3 H |
| 10 | ~20 μm | 0.6 J/cm$^2$ | ~75 | 3 H |

[1]Irradiated amount of light for crosslinking with an F 300 H lamp (total UV A, B, C) measured with a radiometer from the EIT company.
[2]Solvent resistance of the hardened film, tested by repeated rubbing of the film surface with a woodpulp cloth impregnated with methyl ethyl ketone (MEK). The number of rubbings that still did not produce any visible damage to the coating was measured.
[3]Lead pencil hardness after the hardening, at which the film exhibits the first visible signs of damage.

(Comparison of Cured Coatings)

The decisive factor for obtaining the properties according to the invention (hardness and tack-free surface) after the UV crosslinking of the products is the maintenance of the reaction parameters during the production, i.e., the reaction of β-ketoesters, β-diketones, or a mixture thereof with poly-functional acrylic acid esters in the presence of special catalysts at elevated temperature, and the maintenance of a specific reaction time that is predetermined by the end of the rise in viscosity.

Products are formed by this production procedure that under UV irradiation in air exhibit only a slight tendency to so-called oxygen inhibition (Peter G. Garrett, "Strahlenhärtung" Vincentz Verlag, Hanover, 1996, pp. 67 and 73) and therefore have a good surface hardness.

If the reaction of poly-functional acrylic acid esters with β-diketones, β-ketoesters, β-diketones, or a mixture is carried out without using a catalyst, even at a reaction temperature of 130° C., no products are obtained which can produce hard and solvent-resistant coatings when crosslinked using UV (Comparative Example 2).

Also, although the mixture of poly-functional acrylic acid esters and β-ketoester that was produced at low temperature under catalysis with diazabicycloundecene (DBU) exhibits a certain solvent resistance after the UV crosslinking, the coatings are much softer and their surface is greasy and/or tacky (Comparative Example 1).

The followings are the results of evaluation of their cured products.

| Product of Example | Layer Thickness | Irradiated Energy[1] | Solvent Resistance[2] | Lead Pencil Hardness[3] | Surface Hardening |
|---|---|---|---|---|---|
| 1 | ~25 μm | 0.4 J/cm² | >75 | 4H | Dry |
| Comparative Example 1 | ~25 μm | 0.4 J/cm² | >75 | 2B | Poor (Surface greasy) |
| Comparative Example 2 | ~25 μm | 0.4 J/cm² | ~2 | — | Product remains liquid (no crosslinking) |

[1] Irradiated amount of light for crosslinking with an F 300 H lamp (total UV A, B, C) measured with a radiometer from the EIT company.
[2] Solvent resistance of the hardened film, tested by repeated rubbing of the film surface with a woodpulp cloth impregnated with methyl ethyl ketone (MEK). The number of rubbings that still did not produce any visible damage to the coating was measured.
[3] Lead pencil hardness after the hardening, at which the film exhibits the first visible signs of damage.

Example 11

Production of Day Light Curable Resin and Curing Test with Day Light

A mixture 15.0 g of acetyl acetone and 85.0 g of trimethylolpropane triacrylate (TMPTA) and 0.70 g of diazabicycloundecene (DBU) was stirred at 80° C. for 2 hours. The formed resin showed a viscosity of 29500 mPas at 25° C. This highly viscous resin was transferred on top of an aluminum test panel at a thickness of 0.3 to 0.5 cm. The coating surface and the edges of the coating were sealed with a thin polyethylene film and put into sunlight (no clouds, 3:00 pm, 51° latitude, September, T=15° C.). After about 10 minutes the coating under the protective film got warm and after 30 minutes, the polyethylene film was removed, yielding a solvent resistant crosslinked on top of the aluminum test panel.

Example 12

Production of Day Light Curable Resin and Curing Test with Day Light 594.0 g of trimethylolpropane triacrylate (TMPTA) was mixed with 0.05 g of 4-methoxyphenol, heated to 40° C. and aerated. Then, 11.0 g of trioctyl phosphine was added followed by 116.0 g of methyl acetoacetate. The temperature increased to 85° C. within several minutes and was kept at that temperature for three hours, first by water cooling until the exothermic reaction subsided and then by external heating. After cooling to room temperature a paste-like almost colorless resin was formed having a viscosity of 46 Pas at 25° C., and a molecular weight Mw=4500. Approx. 100 g of the resin was transferred into a polyethylene bag, residual air was removed by vacuum evacuation and the bag sealed. The bag, which had a dimension of approx. 10 cm×10 cm×1 cm was placed in sunlight (no clouds, 9:00 am, 51° latitude, September, T=15° C.). After 7 minutes the bag became warm and thinner areas of the bag start to solidify. After 20 minutes, the entire content of the bag was solid. After removal of the bag, solid and solvent resistant plastic sheets were obtained.

Example 13

Production of Day Light Curable Resin and Curing Test with Day Light

The same resin as in experiment 2 was put on top of an aluminum test panel at a thickness of about 2 to 3 mm. The coating was carefully covered by a polyethylene film, so that oxygen was excluded and the specimen was put in sunlight but behind a glass screen, which filters out the light. It took about 6 hours to obtain the coating solid.

What is claimed is:

1. A photocurable composition containing a resin having an acryloyl group and a chemical structure element selected from the group consisting of β-diketone groups and β-ketoester groups, wherein the β-diketone group or the β-ketoester group has a tetra-substituted carbon atom between two carbonyl groups, which is capable of generating one or two free radicals under photoirradiation, and the photocurable composition does not increase more than 25% in viscosity when heated at 60° C. for 5 days.

2. A photocurable composition according to claim 1, wherein the tetra-substituted carbon atom has two substituents selected from the group consisting of 1) an electron attracting group,
   2) an alkyl group having a carbon number of 1 to 8, and
   3) an alkyl group having a carbon number of 1 to 8, which has an electron attracting group at the β or γ position to both carbonyl groups of the β-diketone group or the β-ketoester group,
      wherein the alkyl group 2) is methyl or ethyl group when each of the two substituents is the alkyl group 2).

3. A photocurable composition according to claim 2, wherein the β-diketone group having the two substituents at the tetra-substituted carbon atom is represented by the following formula (1)

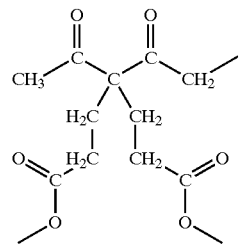

4. A photocurable composition according to claim 2, wherein the β-ketoester group having the two substituents at the tetra-substituted carbon atom is represented by the following formula (2)

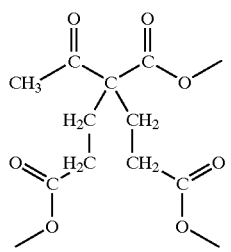

5. A photocurable composition according to claims 1 to 4, wherein the resin has a molecular weight (Mn) of 500 to 20,000.

6. A photocurable composition according to claim 1, wherein the composition further contains an acrylic monomer.

7. A photocurable composition according to claim 1, wherein the composition further contains a pigment.

8. A process for producing a photocurable resin which does not increase more than 25% in viscosity when heated at 60° C. for 5 days comprising:

reacting a β-ketoester or a β-diketone with a polyfunctional acrylic acid ester in the presence of a catalyst under the conditions that a) the reaction temperature is 60 to 140° C., b) the ratio of acrylic acid groups to β-dicarbonyl groups is 2.5:1 to 20:1.

9. A process according to claim 8, wherein the catalyst is selected from the group consisting of organic ammonium fluorides.

10. A process according to claim 8, wherein the catalyst is selected from the group consisting of tertiary organic phosphines.

11. A crosslinked product obtained by photoirradiation of the composition according to claim 1.

* * * * *